United States Patent [19]
Smith

[11] 4,323,788
[45] Apr. 6, 1982

[54] D-C POWER SUPPLY FOR PROVIDING NON-INTERRUPTIBLE D-C VOLTAGE

[75] Inventor: Edward M. Smith, Trumansburg, N.Y.

[73] Assignee: Borg-Warner Corporation, Chicago, Ill.

[21] Appl. No.: 193,313

[22] Filed: Oct. 2, 1980

[51] Int. Cl.$^3$ ............................................. H02J 7/00
[52] U.S. Cl. ...................................... 307/66; 320/14; 320/15
[58] Field of Search ................. 307/66, 51, 86, 130; 320/14, 15, 8

[56] References Cited
U.S. PATENT DOCUMENTS
3,577,003  5/1971  Behr ........................................ 307/66

FOREIGN PATENT DOCUMENTS
54-4347  1/1979  Japan ..................................... 307/51

*Primary Examiner*—Michael L. Gellner
*Assistant Examiner*—James L. Dwyer
*Attorney, Agent, or Firm*—James E. Tracy

[57] ABSTRACT

To maintain a continuous non-interruptible d-c operating voltage for powering a load, where the operating voltage is produced from a-c line voltage subject to failure or low voltage transients, the required operating voltage is provided by two rechargeable batteries which are alternately connected to the load. While one battery supplies the d-c power to the load, the other battery is being charged by a battery charger which is driven by the a-c line voltage. As the active battery slowly discharges and the d-c operating voltage drops to a predetermined threshold level, the battery connections are automatically switched, the charged battery being connected to the load while the discharged battery is coupled to the battery charger for recharging. The connections to and from the batteries include SCR's which receive gating pulses only when a battery switch is to occur. No continuous gating signal is needed. In the event of an a-c power outage or failure, the d-c operating voltage applied to the load will not be interrupted, nor will a momentary drop occur during the transition from one battery to the other. Moreover, by cycling each battery through its charge-discharge curve the battery's ampere-hour capacity is maintained.

7 Claims, 1 Drawing Figure

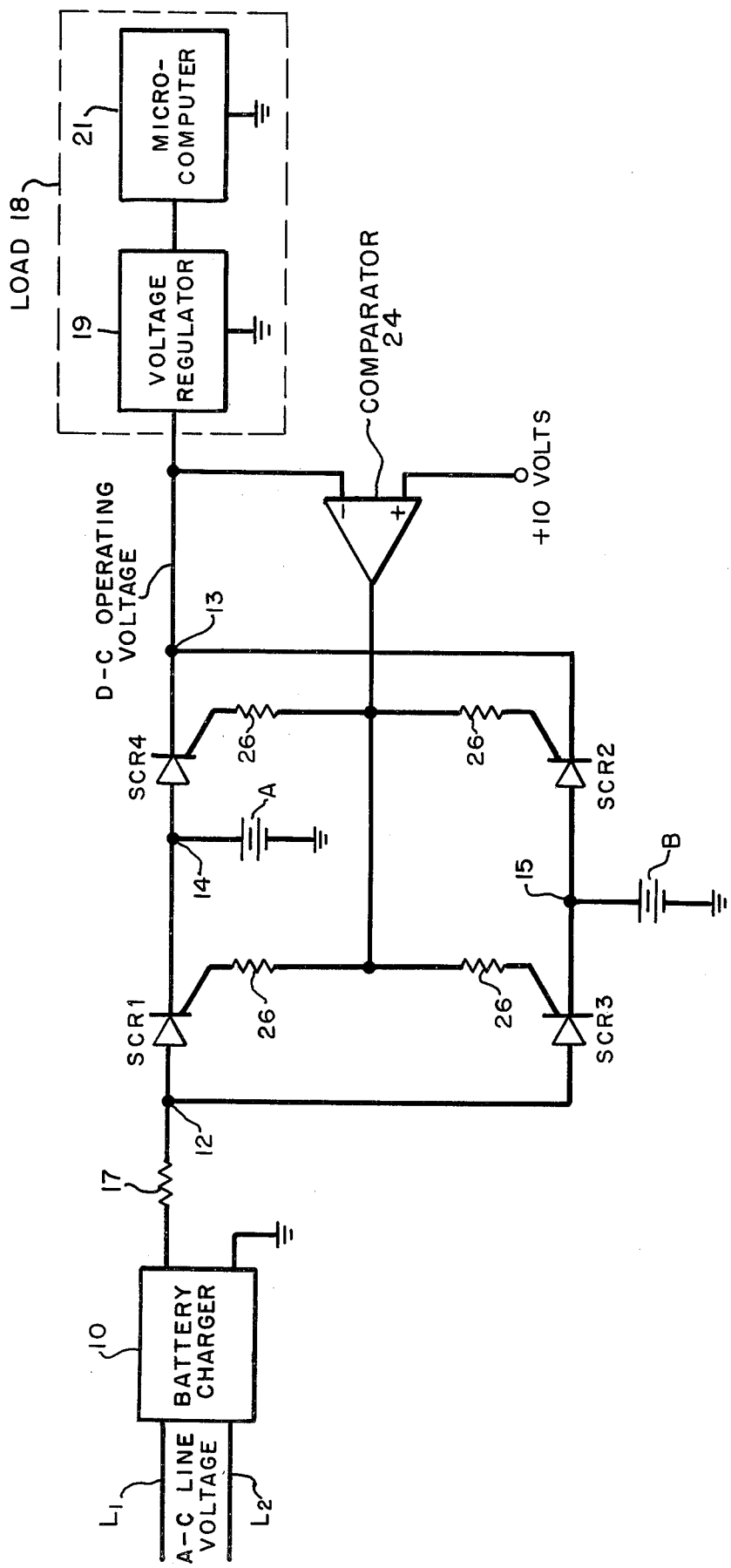

D-C POWER SUPPLY FOR PROVIDING NON-INTERRUPTIBLE D-C VOLTAGE

BACKGROUND OF THE INVENTION

This invention relates to a d-c power supply for producing non-interruptible d-c power for energizing a load to ensure continuous uninterrupted operation thereof, the d-c power being derived from a primary power source which may fail from time to time. The primary power source may take a variety of different forms, such as an a-c line voltage source, a gasoline engine-driven generator, a solar powered generator, a wind-driven generator, etc. The invention will be described in an environment where the non-interruptible d-c power is derived from a-c line voltage.

Many loads, including microcomputers or microprocessors, require the continuous application of an operating potential of relatively fixed magnitude to operate properly. If there is a power loss, even though momentary, the operation of a microcomputer will be deleteriously affected. For example, the memory devices may store false information that was not there originally. Moreover, when power is restored, the microcomputer could receive erroneous command signals. Hence, it is most desirable that d-c power be constantly supplied to a microcomputer so that it will not adversely suffer from a loss of primary power, or a-c line voltage in the illustrated embodiment.

In many cases where a load requires non-interruptible d-c power, backup power is available from a standby rechargeable battery. With such a battery backup system, the battery will usually be connected to the load automatically in response to a power outage. Unfortunately, when the switchover or substitution of power supplies occurs, there may be a momentary voltage drop or transient that could disrupt the operation of the load, particularly when the load is a microprocessor. In addition, after the battery is connected to the load the battery voltage may decrease rapidly if the ampere-hour capacity has not been maintained. Many rechargeable batteries must be allowed to go through their charge-discharge cycles to maintain their ampere-hour capacity.

The present invention overcomes the shortcomings of prior backup arrangements by providing a d-c voltage source which is energized by a primary power source and yet there is absolutely no change in the d-c voltage when a failure or low voltage transient occurs in the primary source. The unique d-c power supply of the invention is of relatively simple and inexpensive construction, employing backup power from a battery that will always be at full ampere-hour capacity.

SUMMARY OF THE INVENTION

The d-c power supply of the invention provides a d-c operating voltage for powering a load, the magnitude of the operating voltage being held above a predetermined threshold level to maintain continuous uninterrupted operation of the load. The d-c power supply comprises a d-c power source for providing a d-c charging voltage. There are means, including a series-connected first SCR (silicon controlled rectifier), for coupling the d-c power source to a first rechargeable battery to charge that battery. Means, including a series-connected second SCR, couple a second rechargeable battery to the load to provide the required operating voltage for the load while the first battery is being charged. There are means, including a series-connected third SCR, for coupling the d-c power source to the second battery, the third SCR being non-conductive while the first battery is being charged and when the second battery is supplying the operating voltage. Means, including a series-connected fourth SCR, couple the first battery to the load, the fourth SCR being non-conductive when the second battery supplies the operating voltage to the load. Finally, the d-c power supply of the invention comprises control means or mode switching means, responsive to the operating voltage, for turning on the third and fourth SCR's, and for turning off the first and second SCR's, when the second battery slowly discharges to the extent that the operating voltage drops to the predetermined threshold level, the charged first battery thereby being disconnected from the d-c power source and connected to the load to supply the required operating voltage while at the same time the discharged second battery is disconnected from the load and connected to the d-c power source for recharging.

DESCRIPTION OF THE DRAWING

The features of the invention which are believed to be novel are set forth with particularity in the appended claims. The invention may best be understood, however, by reference to the following description in conjunction with the accompanying drawing which schematically illustrates a d-c power supply, constructed in accordance with the present invention, and the manner in which that power supply drives a load that includes a microcomputer.

DESCRIPTION OF THE ILLUSTRATED EMBODIMENT

Line conductors $L_1$ and $L_2$ provide a conventional source of single-phase a-c line voltage varying in sinusoidal fashion at a commutating frequency of 60 hertz and having a normal amplitude of around 120 volts. The a-c power line voltage is rectified by battery charger 10 to produce a d-c charging voltage of an appropriate magnitude for charging batteries A and B in alternation. For example, if the batteries are 12-volt batteries, a charging voltage of around +15 volts will appear at the upper output terminal of charger 10 relative to its lower terminal which is connected to a ground plane of reference potential. As will become apparent, the combination of the a-c line voltage source and battery charger 10 may be constituted by any d-c power source which produces a d-c charging voltage. For example, the d-c charging voltage could be developed by a wind-driven generator or a diesel engine-generator. The charging voltage need not be continuous since, in accordance with the invention and in a manner to be described, interruptions in the charging voltage will not affect the d-c operating voltage supplied to the load.

The four silicon controlled rectifiers (SCR's 1–4) along with the rechargeable batteries A and B form a network having an input terminal or node 12 and an output terminal or node 13, SCR's 1 and 4 being series-connected between those terminals, while SCR's 3 and 2 are also series-connected between nodes 12 and 13. The positive terminal of battery A is connected to the circuit junction or node 14 between SCR's 1 and 4. More specifically, the positive battery terminal is connected to the cathode of SCR 1 and to the anode of SCR 4. The positive terminal of battery B connects to the circuit junction or node 15 between SCR's 3 and 2, namely to the cathode of SCR 3 and to the anode of SCR 2. The negative terminals of 12-volt batteries A and B are grounded.

Input terminal or node 12 connects via a series-limiting resistor 17 to the ungrounded output terminal of charger 10, while output terminal or node 13 is coupled to an input of load 18 to supply thereto a continuous d-c operating voltage for energizing the load. A voltage regulator 19, precedes microcomputer 21 in load 18 so that the d-c voltage applied to the microcomputer will be well regulated and will remain fixed at a constant desired magnitude even though the particular battery, which supplies the d-c operating voltage at the time, may discharge and deviate from its normal full charge output voltage.

To understand the operation of the invention, assume initially that battery A is in a discharged state (about +10 volts), that battery B is fully charged (about +14 volts) and that SCR's 1 and 2 are conducting or turned on, thereby coupling battery charger 10 to battery A and coupling battery B to load 18 to provide the required d-c operating voltage. At this time, the voltage at node 12 will be the discharged battery voltage (about +10 volts) plus the forward conducting voltage of SCR 1. Node 15 will be at the full-charge battery voltage (about +14 volts) so SCR 3 will be reverse biased and thus turned off. Meanwhile, node 13 will be at the full-charge battery voltage minus the forward conducting voltage of SCR 2, while node 14 will be at the discharged battery voltage. As a result, SCR 4 will be back biased and non-conductive.

In this operating mode, the d-c power for microcomputer 21 will be supplied by battery B via SCR 2, while at the same time battery charger 10 will be recharging battery A via SCR 1. When the system is initially established in this operating mode, the d-c operating voltage will be close to +14 volts. However, as time goes on and battery B continues to provide the energizing voltage for microcomputer 21, battery B will slowly discharge and the operating voltage at node 13 decreases. Microcomputer 21 will be unaffected by the decrease in operating voltage since voltage regulator 19 may be constructed to provide a constant, lower amplitude voltage for the microcomputer even though the input voltage to the regulator may vary over a substantial range. For example, a fixed output voltage of around +5 volts may be produced by regulator 19 for energizing the microcomputer.

Eventually, battery B will slowly discharge to the extent that the d-c operating voltage drops to a predetermined threshold level below which load 18 will not operate properly. Of course, long before this occurs battery A will have been fully charged so the voltage at node 14 will be established at about +14 volts. However, even though battery A may be fully charged while battery B is still the active battery and is supplying load 18, no change takes place in the conductive status of the SCR's. SCR's 1 and 2 will remain conductive while SCR's 3 and 4 will remain non-conductive. This occurs inasmuch as no gating signals are applied to the SCR's.

In accordance with a salient feature of the invention, a control arrangement is provided which senses the d-c operating voltage at node 13 and in response to that voltage dropping to the predetermined threshold level (+10 volts in the illustrated embodiment) turns SCR's 3 and 4 on and SCR's 1 and 2 off, thereby automatically switching the battery connections so that the charged battery A will be coupled to load 18 while the discharged battery B will be coupled to battery charger 10 for recharging. To explain, this is achieved by voltage comparator 24 whose (−) input connects to node 13 and whose (+) input is connected to a potential source of +10 volts. As long as the d-c operating voltage at node 13 is above the +10 volts threshold level, a comparison of that voltage in comparator 24 with the reference voltage at the (+) input results in a zero output voltage from the comparator. However, as soon as the d-c operating voltage decreases to the threshold level, a positive-going pulse will be produced at the comparator's output. If desired, this pulse can be accentuated by employing a differentiating circuit. In any event, the output pulse generated by the comparator, when battery B drops the operating voltage to the threshold level, serves as a gating pulse which is applied, via resistors 26, to the gates of all four SCR's. At this instant, SCR 4 will be forward biased since its anode will be positive relative to its cathode due to the fully charged battery A. SCR 4 will therefore be gated on and will apply the battery A voltage to the load. The single gating pulse will also find SCR 3 in a forward biased condition because of the low discharged battery voltage at node 15, thereby rendering SCR 3 conductive in order to connect the battery charger to battery B. Node 12 will be pulled down to the discharged battery voltage of battery B plus the forward conducting voltage of SCR 3, leaving SCR 1 reverse biased. SCR 1 thus becomes non-conductive. Since the gating pulse causes the fully charged battery A to be connected to node 13, SCR 2 will be back biased and will cease conducting.

Hence, as the result of a single pulse produced when battery B discharges and drops the d-c operating voltage to the predetermined +10 volts threshold level, the fully charged battery A is effectively activated so that it will supply the required operating voltage to load 18. Of course, as this operating mode continues battery A slowly discharges and its voltage will eventually decrease to the threshold level, whereupon comparator 24 produces a gating pulse for application to each of the four SCR's, causing SCR's 1 and 2 to turn on and SCR's 3 and 4 to turn off. Once again, fully charged battery B provides the necessary d-c operating voltage for the load, while discharged battery A connects to the battery charger for recharging. As microcomputer 21 is continuously operated over a long period, batteries A and B will alternately supply the operating voltage to that microcomputer.

In the event of either a complete power failure or a substantial reduction in the a-c line voltage, the d-c charging voltage produced by charger 10 immediately drops. This will have no effect on the d-c operating voltage supplied to load 18, however, because the source of that operating voltage is isolated from the battery charger. As a consequence, the operation of the load is immune to power outages or low voltage transients.

The invention provides, therefore, a relatively simple and reliable arrangement for delivering non-interruptible d-c power to an apparatus. There will always be the equivalent of one fully charged battery available to power the load in the event of power failure. Note that by employing SCR's no latching circuitry is necessary. No continuous base drive signals are needed as would be the case with transistors. Moreover, it is not essential to include logic circuits for firing the SCR's in predetermined pairs. All four SCR's may be triggered simultaneously with the same effect. All that is needed is some control means or mode switching means for applying a single gating pulse to all of the SCR's when the battery switch is to occur. There is no need to sense which battery is charged or discharged, and continuous d-c output is assured by circuit action without special precautions.

It is also to be appreciated that the operating voltage supplied to the load cannot drop momentarily during the transition from one battery to the other. This occurs because SCR's 2 and 4 are never turned off at the same time. Thus, it is not necessary to employ complex circuitry to ensure an overlap during the transition time. Furthermore, by cycling the batteries through their charge-discharge curves the ampere-hour capacities of the batteries will be maintained. There will never be a problem of switching to a backup battery, when a power failure occurs, and finding that the apparently charged backup battery has in fact very little ampere-hour capacity and will discharge rapidly, as can happen with prior battery backup systems.

While a particular embodiment of the invention has been shown and described, modifications may be made, and it is intended in the appended claims to cover all such modifications as may fall within the true spirit and scope of the invention.

I claim:

1. A d-c power supply for providing a d-c operating voltage for powering a load, the magnitude of the operating voltage being held above a predetermined threshold level to maintain continuous uninterrupted operation of the load, said d-c power supply comprising:
   a d-c power source for providing a d-c charging voltage;
   first and second rechargeable batteries;
   means, including a series-connected first SCR, for coupling said d-c power source to said first battery to charge said first battery;
   means, including a series-connected second SCR, for coupling said second battery to the load to provide the required operating voltage for the load while said first battery is being charged;
   means, including a series-connected third SCR, for coupling said d-c power source to said second battery, said third SCR being non-conductive while said first battery is being charged and when said second battery is supplying the operating voltage;
   means, including a series-connected fourth SCR, for coupling said first battery to the load, said fourth SCR being non-conductive when said second battery supplies the operating voltage to the load;
   and control means, responsive to the operating voltage, for turning on said third and fourth SCR's, and for turning off said first and second SCR's, when said second battery slowly discharges to the extent that the operating voltage drops to the predetermined threshold level, the charged first battery thereby being disconnected from the d-c power source and connected to the load to supply the required operating voltage while at the same time the discharged second battery is disconnected from the load and connected to the d-c power source for recharging.

2. A d-c power supply for providing, from applied a-c line voltage, a d-c operating voltage for powering a load, the magnitude of the operating voltage being held above a predetermined threshold level to maintain continuous uninterrupted operation of the load, said d-c power supply comprising:
   a battery charger for rectifying the a-c line voltage to develop therefrom a d-c charging voltage;
   first and second rechargeable batteries;
   means, including a series-connected first SCR, for coupling said charger to said first battery to charge said first battery;
   means, including a series-connected second SCR, for coupling said second battery to the load to provide the required operating voltage for the load while said first battery is being charged;
   means, including a series-connected third SCR, for coupling said charger to said second battery, said third SCR being non-conductive while said first battery is being charged and when said second battery is supplying the operating voltage;
   means, including a series-connected fourth SCR, for coupling said first battery to the load, said fourth SCR being non-conductive when said second battery supplies the operating voltage to the load;
   and control means, responsive to the operating voltage, for turning on said third and fourth SCR's, and for turning off said first and second SCR's, when said second battery slowly discharges to the extent that the operating voltage drops to the predetermined threshold level, the charged first battery thereby being disconnected from the charger and connected to the load to supply the required operating voltage while at the same time the discharged second battery is disconnected from the load and connected to the battery charger for recharging.

3. A d-c power supply according to claim 2 wherein said batteries and SCR's form a network having an input terminal and an output terminal, said first and fourth SCR's being series-connected between said input and output terminals, said third and second SCR's being series-connected between said input and output terminals, said first battery being connected between the circuit junction of said first and fourth SCR's and a ground plane of reference potential, said second battery being connected between the circuit junction of said third and second SCR's and the ground plane, said input terminal being connected to one of two output terminals of said battery charger, the other output terminal of said charger being grounded, and said output terminal of said network being connected to one of two input terminals of the load, the other input terminal of the load being grounded.

4. A d-c power supply according to claim 2 wherein sid battery charger has one output terminal connected to a ground plane of reference potential and another ungrounded output terminal, wherein the anodes of said first and third SCR's are connected to the ungrounded output terminal of said charger, wherein the cathode of said first SCR and the anode of said fourth SCR are connected to the positive terminal of said first battery, the negative terminal of which is grounded, wherein the cathode of said third SCR and the anode of said second SCR are connected to the positive terminal of said second battery, the negative terminal of which is grounded, and wherein the cathodes of said second SCR and fourth SCR connect to one of two input terminals of the load, another input terminal of which is grounded.

5. A d-c power supply according to claim 2 wherein said control means senses the operating voltage and applies gating pulses to all four of said SCR's when the operating voltage decreases to the predetermined threshold level.

6. A d-c power supply according to claim 2 wherein said control means includes a voltage comparator which compares the operating voltage with a reference voltage to sense when the operating voltage drops to the predetermined threshold level, at which time said comparator produces a gating pulse for application to each of the four SCR's.

7. A d-c power supply for producing, from applied a-c line voltage, uninterruptable d-c power for operating a load, comprising:

a battery charger for rectifying the a-c line voltage to develop a d-c charging voltage;

first and second rechargeable batteries each of which provides a d-c operating voltage;

means, including a series-connected first SCR, for coupling said battery charger to said first battery;

means, including a series-connected second SCR, for coupling said second battery to the load;

means, including a series-connected third SCR, for coupling said charger to said second battery;

means, including a series-connected fourth SCR, for coupling said first battery to the load, said first and second SCR's being conductive, while said third and fourth SCR's are non-conductive, during the operating mode when said first battery is being charged by said charger and said second battery supplies the operating voltage to the load, during which mode said second battery slowly discharges, and whereas said third and fourth SCR's are conductive and said first and second SCR's are non-conductive during the operating mode when said second battery is being charged and said first battery slowly discharges and provides the operating voltage for the load;

and mode switching means, responsive to the discharging battery dropping the operating voltage to a predetermined threshold level, for supplying gating pulses to said SCR's to turn on the two non-conductive SCR's in order to connect the charged battery to the load and the discharged battery to said charger, whereupon the two previously conductive SCR's become reverse biased and turn off.

* * * * *